United States Patent [19]

Ghate et al.

[11] Patent Number: 5,016,817

[45] Date of Patent: May 21, 1991

[54] PESTICIDE SPRAYING DEVICE AND METHOD

[75] Inventors: Suhas R. Ghate; Sharad C. Phatak, both of Tifton, Ga.

[73] Assignee: University of Georgia Research Foundation, Inc., Athens, Ga.

[21] Appl. No.: 433,503

[22] Filed: Nov. 8, 1989

[51] Int. Cl.[5] .......................... B05B 7/32; B05B 15/02; B05B 9/04

[52] U.S. Cl. .......................................... 239/113; 239/304; 239/308; 239/310; 239/373

[58] Field of Search ............... 239/304, 307, 308, 310, 239/10, 112, 113, 159, 172, 373

[56] References Cited

U.S. PATENT DOCUMENTS

| | | | |
|---|---|---|---|
| 679,504 | 7/1901 | Heard . | |
| 748,971 | 1/1904 | Millspaugh . | |
| 1,198,036 | 9/1916 | Jackson . | |
| 2,210,934 | 8/1940 | Gleason | 239/113 |
| 2,340,832 | 2/1944 | Damme et al. . | |
| 2,511,626 | 6/1950 | Einbecker . | |
| 3,103,312 | 9/1963 | Damrow . | |
| 3,473,481 | 10/1969 | Brane | 239/310 X |
| 3,521,817 | 7/1970 | Curtis et al. | 239/307 X |
| 3,806,037 | 4/1974 | Loewenkamp | 239/310 |
| 3,829,024 | 8/1974 | Heden | 239/310 |
| 3,865,308 | 2/1975 | Pringle et al. | 239/172 X |
| 4,067,498 | 1/1978 | Holcomb | 239/304 |
| 4,714,196 | 12/1987 | McEachern et al. | 239/308 X |

FOREIGN PATENT DOCUMENTS

| | | | |
|---|---|---|---|
| 627410 | 9/1961 | Canada | 239/307 |

OTHER PUBLICATIONS

Reichard, Tennes, Burton, and Brown, "Experimental Orchard Sprayer," *Transactions of the ASAE* 33–37 and 41 (1982).

Vidrine, Goering, Day, Gebhardt, and Smith, "A Constant Pesticide Application Rate Sprayer Model," *Transactions of the ASAE* 439–43 (1975).

Harrell, Hare, and Young, "Mixing Pesticide with Water Concurrently with Spraying," *Journal of Economic Entomology* 1211–13, vol. 66, No. 5 (Oct. 1973).

W. Rudolph, "Controlled Application," in *Agricultural Electronics: 1983 and Beyond* vol. I, at pp. 91–98.

*Primary Examiner*—Andres Kashnikow
*Assistant Examiner*—William Grant
*Attorney, Agent, or Firm*—Kilpatrick & Cody

[57] ABSTRACT

A device and method for precisely spraying quantities of pesticides or other chemicals or fluids with little waste is disclosed. The invention includes dual tanks, one each for the concentrated fluid (typically pesticide) and diluting agent (typically water), and a means for automatically mixing their contents downstream of the tanks during the spraying operation. Variable pressure controls, fluid flow rate monitoring devices, and a finely-gauged injection means such as a hollow needle allow for precise mixing of the two fluids contained in the tanks, making the sprayer useful for applying biological control agents as well.

5 Claims, 3 Drawing Sheets

PESTICIDE SPRAYING DEVICE AND METHOD

This invention relates to the spraying of pesticides and biological control agents, particularly in agricultural applications.

BACKGROUND OF THE INVENTION

Devices for spraying pesticides such as fungicides, herbicides, and insecticides are widely used by farmers throughout the world. Existing sprayers typically are tractormounted implements having a single tank supplying a mixture of pesticide and water to a series of spray nozzles. A pump connected to the tank forces the pesticidal solution from the tank to the nozzles, from which the solution is sprayed onto crops or other vegetation to be protected.

Because existing sprayers utilize but one tank and pesticide is most readily available in concentrated form, the operator must mix undiluted pesticide with water when preparing for a spraying operation. Such manual mixing is relatively imprecise, often precluding the optimal pesticidal solution from being used to spray the crops. Moreover, because existing pump sprayers are relatively inefficient, a portion of the pesticidal solution remains at the end of each spraying and must be emptied by the operator if a solution of different strength or type is needed thereafter. Both mixing and disposal, therefore, pose various dangers to the operator and to the environment, in that the operator is exposed to health risks associated with the handling of pesticides while the residue disposal area is subjected to receiving the pesticidal pollutant.

SUMMARY OF THE INVENTION

The present invention consists of a device for precisely spraying pesticides or other chemicals or fluids with high efficiency. The invention includes dual tanks, one each for the concentrated fluid (typically pesticide) and diluting agent (typically water), and a means for automatically mixing their contents downstream of the tanks during the spraying operation. Because the present device utilizes two tanks instead of one and an air compressor instead of a pump, it avoids many of the problems associated with existing sprayers, including those involving the disposal of unused pesticidal mixtures. Variable pressure controls, fluid flow rate monitoring devices, and finely-gauged injection means such as a hollow needle also allow for precise mixing of the two fluids contained in the tanks, making the sprayer useful for applying biological control agents as well.

It is therefore an object of the present invention to provide a device for spraying fluids which automatically mixes two fluids maintained in separate containers.

It is another object of the present invention to provide a device for spraying fluids efficiently and without leaving unused pesticidal mixtures which must be disposed before a subsequent spraying operation may begin.

It is yet another object of the present invention to provide a means for mixing the fluids to be sprayed with precision.

Other objects, features, and advantages of the present invention will become apparent with reference to the remainder of the written portion and the drawings of this application.

DETAILED DESCRIPTION OF THE DRAWINGS

Figure 1:
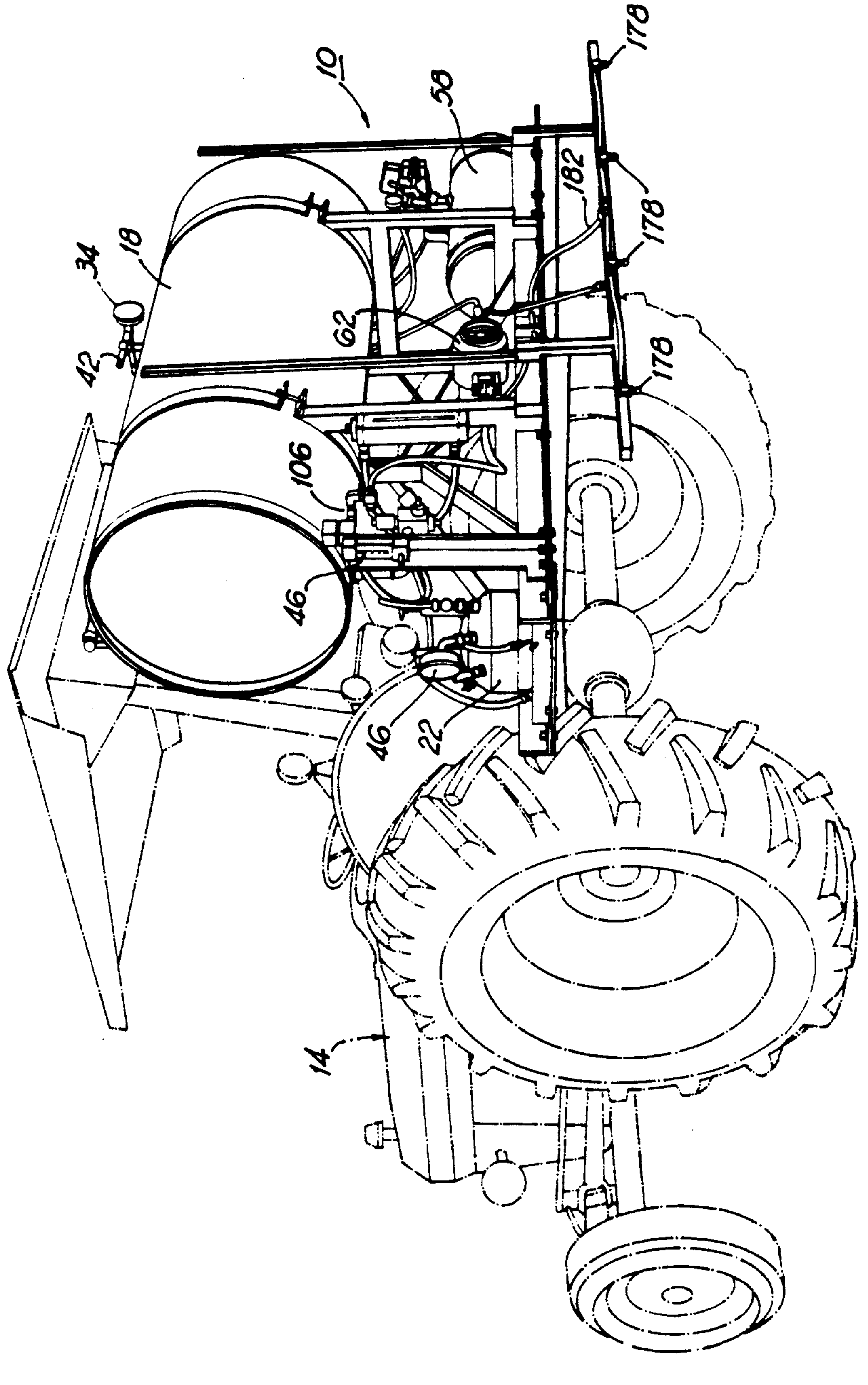
FIG. 1 is a perspective view of the sprayer of the present invention shown mounted on a tractor.

FIG. 1 details the sprayer 10 of the present invention mounted on a tractor 14. Sprayer 10 is not limited to use in connection with tractor 14, however, and may easily be adapted for home gardening or greenhouse applications by, for example, mounting onto a wheelbarrow or other suitable support structure. Sprayer 10 also may be connected to a stationary center pivot irrigation system.

Figure 2:
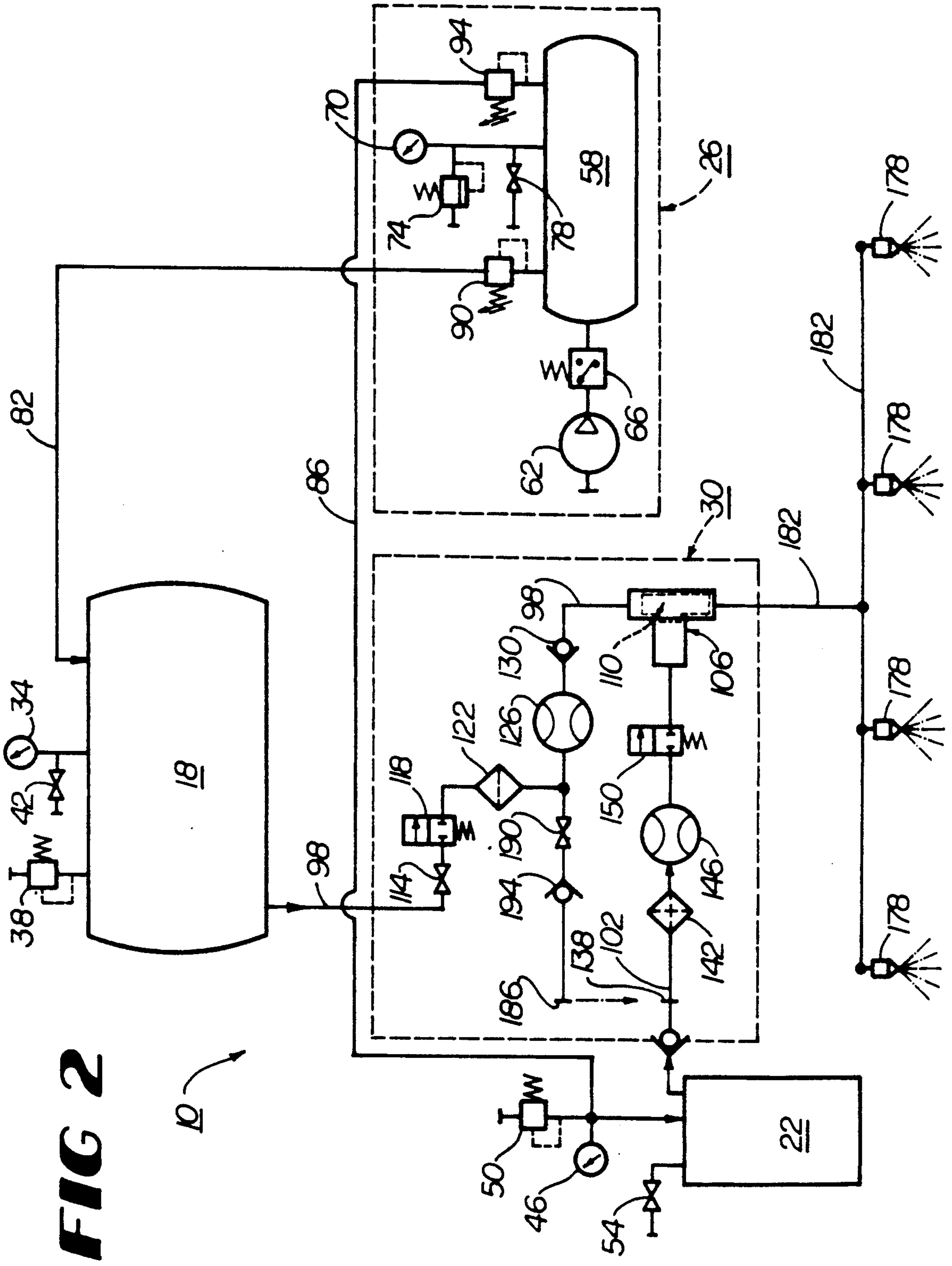
FIG. 2 is a schematic representation of the sprayer of FIG. 1.

As illustrated in FIGS. 1–2, sprayer 10 includes tanks 18 and 22, compressed air mechanism 26, and mixer 30. Tank 18, shown in FIGS. 1–2 as larger than tank 22, typically holds the diluting or suspending agent (e.g. water or oil) and may be any standard container such as a plastic or metal drum suitable for that purpose. Included on tank 18 are pressure guage 34, relief valve 38, and manual shut-off valve 42.

Tank 22, on the other hand, is used as a container for the concentrated pesticide or other active chemical or fluid; it too may be any standard container suitable for that purpose. Those skilled in the art will recognize that the relative sizes of tanks 18 and 22 are dependent upon the fluids which the tanks contain and the applications for which the fluids are being used, and that tank 22 containing the active fluid may of necessity be larger than tank 18 on some occasions. Like tank 18, tank 22 includes a pressure guage 46, relief valve 50, and manual shutoff valve 54.

Compressed air mechanism 26 functions to pressurize tanks 18 and 22 and force fluids from those tanks to mixer 30. The mechanism 26 includes tank 58 for holding air, compressor 62, switch 66, pressure gauge 70, relief valve 74, and manual shutoff valve 78. Lines or pipes 82 and 86 connect air mechanism 26 to tanks 18 and 22, respectively. Disposed in each of these lines 82 and 86 is a pressure regulator (90 and 94), thereby allowing tanks 18 and 22 to be maintained at separate pressures.

Figure 3:
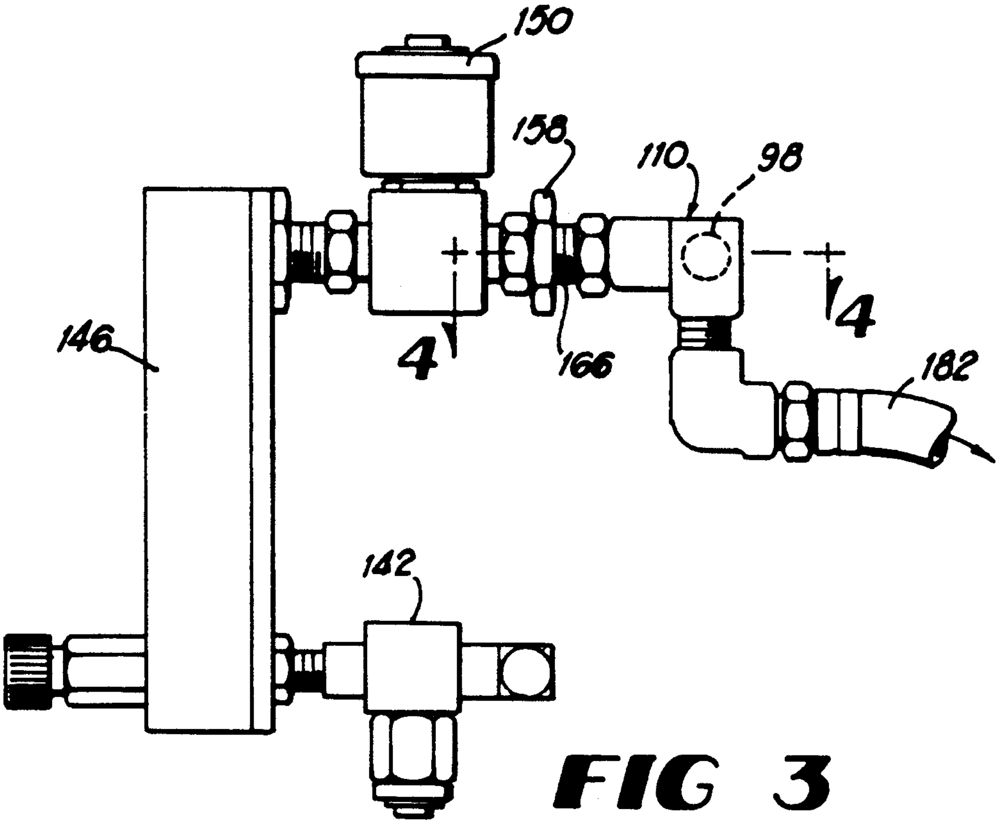
FIG. 3 is an elevational view of a portion of the sprayer of FIG. 1.
Figure 4:
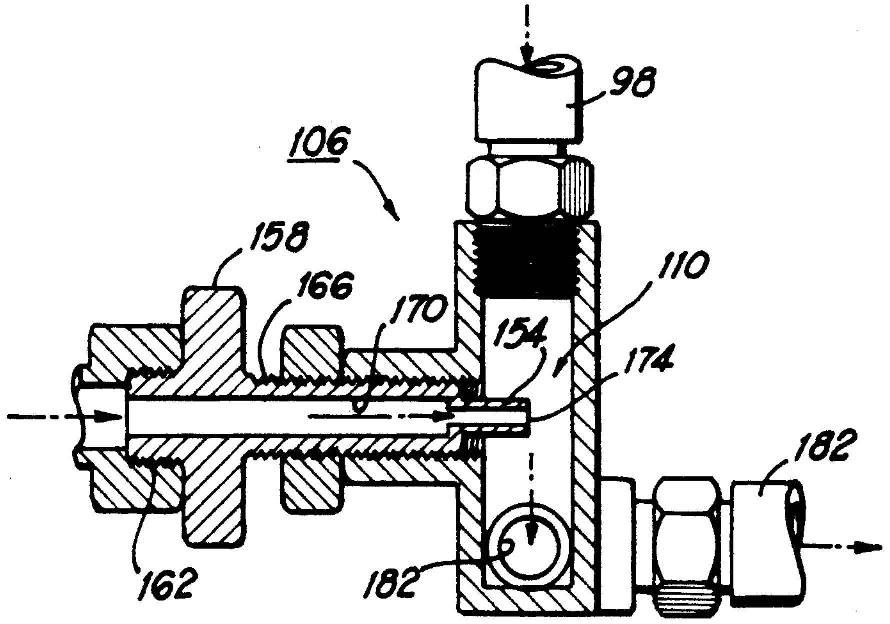
FIG. 4 is a cross-sectional view of the precision injection mechanism of the sprayer taken along lines 4—4 in FIG. 3.

Mixer 30 (FIGS. 2–3) includes lines 98 and 102, injection device 106 (FIGS. 2 and 4), and mixing chamber 110. Line 98, which connects tank 18 to mixing chamber 110, contains manual shut-off valve 114, valve 118, which may be a solenoidoperated valve, strainer 122, flow rate meter 126, and check valve 130, which prevents fluid from the injection device 106 from flowing back to tank 18. Line 102 connects tank 22 to injection device 106. Disposed intermediate tank 22 and injection device 106 on line 102 are a connector 138, strainer 142, floW rate meter 146, and valve 150, which like valve 118 may be a solenoid-operated valve.

Injection device 106 steadily introduces fluid such as pesticide from tank 22 into mixing chamber 110 for thorough mixing with the diluting or suspending fluid from tank 18. In one embodiment (FIG. 4) injection device 106 consists of an injection needle 154 (such as any hollow needle forming a small diameter tube through which fluid may travel) associated with a hexagonal grip 158, which grip 158 is similar to a bolt head and adjustable using an appropriate wrench. The ends 162 and 166 of hexagonal grip 158 are threaded for connecting the grip 158 inline between valve 150 and mixing chamber 110. Bore 170, typically approximately 3 mm in diameter, extends longitudinally through grip 158 and provides a means through Which the fluid from tank 22 may flow into the injection needle 154, which has an interior diameter of approximately 0.75 mm. Preferred results may be obtained by positioning the tip 174 of injection needle 154, through which fluid from tank 22 exits, near the center of flow into mixing chamber 110 of the fluid from tank 18. Once mixed the resulting solution exits mixing chamber 110 to spray nozzles 178 (FIGS. 1-2) through line 182.

The combination of pressure regulators 90 and 94, valves 118 and 150, flow rate meters 126 and 146, and injection needle 154 allows for precise control over the volumes of fluids from tanks 18 and 22 allowed to enter mixing chamber 110. If tank 22 is available with the pesticide already contained within, all operator contact with hazardous fluid may be eliminated, as the entire mixing process may be performed in the closed sprayer 10 system. Using compressed air to force fluids from tanks 18 and 22 allows virtually all of the fluids contained in those tanks to be delivered to the crops for which it is intended, avoiding the wasted fluid and disposal problems typically associated with pump-controlled systems. As a result, not only is the strength of the solution more finely controllable, but the amount of solution actually available for the spraying operation is increased as well.

Once spraying is completed for a particular area or pesticide or biological agent, air supply to tank 22 may be stopped by adjusting pressure regulator 94 and the tank pressure released by opening manual shut-off valve 54. In accordance with the present invention line 102 then may be flushed by disconnecting connector 138, reconnecting it to connector 186 disposed along with a manual shut-off valve 190 and check valve 194 in a branch off the main diluting agent line 98, and opening valve !90. Upon opening of valve 190 pressurized fluid (such as water) from tank 18 will flow through the line 102, thereby flushing it of any pesticidal or other residue. Like check valve 130, valve 194 prevents the contents of line 102 from flowing back into tank 18.

As those having ordinary skill in the art will recognize, various modifications and adaptations to the embodiments described above may be made without departing from the scope or spirit of the invention. If more than one pesticide or biological agent is to be applied at one time, for example, additional tanks, lines, and mixers may be added with those described above. Alternatively, various of the components may be omitted from the system or otherwise substituted or altered without deviating from the inventive concept. If sources of pressurized fluids are otherwise available, for some applications neither the compressed air mechanism 26 nor the tanks 18 and 22 will be required. The foregoing description, therefore, is provided merely for purposes of illustration, explanation, and description of embodiments of the invention and should not be construed to limit the invention in any other way.

We claim:

1. A sprayer comprising:

a. a first reservoir for containing a first fluid to be sprayed;

b. A second reservoir for containing a second fluid to be sprayed;

c. an air compressor connected to the first and second reservoirs for pressurizing the first and second fluids;

d. a first pressure regulator interposed between the air compressor and the first reservoir for controlling the pressure of the first fluid;

e. a second pressure regulator interposed between the air compressor and the second reservoir for controlling the pressure of the second fluid;

f. a mixing chamber having an outlet, which mixing chamber is connected to the first reservoir and releasably connected to the second reservoir, for mixing the first and second fluids and discharging the mixture;

g. a first flow rate meter interposed between the first reservoir and the mixing chamber for monitoring the flow of the first fluid into the mixing chamber;

h. a second flow rate meter interposed between the second reservoir and the mixing chamber for monitoring the flow of the second fluid into the mixing chamber;

i. a check valve interposed between the first reservoir and the mixing chamber for preventing the second fluid from entering the first reservoir;

j. a hollow needle interposed between the second reservoir and the mixing chamber and having a tip extending into the stream of first fluid entering the mixing chamber, for precisely controlling the volume of the second fluid entering the mixing chamber and precisely mixing it with the first fluid; and k. a pipe releasably interposed between the second reservoir and the hollow needle and connectable to the first reservoir for flushing any residue contained in the pipe using the first fluid, which pipe includes a check valve for preventing any of the second fluid from entering the first reservoir.

2. A sprayer comprising:

a. a first reservoir for containing a first fluid to be sprayed;

b. a second reservoir for containing a second fluid to be sprayed;

c. means for pressurizing the first fluid;

d. means, at least partially independent of the first fluid pressurizing means, for pressurizing the second fluid;

e. a mixing chamber having a first inlet for permitting entry of a stream of the first fluid, a second inlet for permitting entry of the second fluid, and an outlet; and f. a hollow needle interposed between the second reservoir and the mixing chamber and extending into the stream of first fluid entering the mixing chamber for precisely controlling the volume of the second fluid entering the mixing chamber and precisely mixing it with the first fluid.

3. A sprayer according to claim 2 in which the means for pressurizing the first and second fluids comprises an air compressor connected to the first and second reservoirs.

4. A sprayer according to claim 3 in which the means for pressurizing the first fluid further comprises a first pressure regulator interposed between the air compressor and the first reservoir and in which the means for pressurizing the second fluid further comprises a second pressure regulator interposed between the air compressor and the second reservoir.

5. A sprayer comprising:

a. a first reservoir for containing a first fluid to be sprayed;

b. a second reservoir for containing a second fluid to be sprayed;

c. an air compressor connected to the first and second reservoirs for pressurizing the first and second fluids;

d. a first pressure regulator interposed between the air compressor and the first reservoir for controlling the pressure of the first fluid;

e. a second pressure regulator interposed between the air compressor and the second reservoir for controlling the pressure of the second fluid;

f. a mixing chamber having an outlet, which mixing chamber is connected to the first reservoir and releasably connected to the second reservoir, for mixing the first and second fluids and discharging the mixture;

g. a first flow rate meter interposed between the first reservoir and the mixing chamber for monitoring the flow of the first fluid into the mixing chamber;

h. a second flow rate meter interposed between the second reservoir and the mixing chamber for monitoring the flow of the second fluid into the mixing chamber;

i. a check valve interposed between the first reservoir and the mixing chamber for preventing the second fluid from entering the first reservoir;

j. a hollow needle interposed between the second reservoir and the mixing chamber for precisely controlling the volume of the second fluid entering the mixing chamber; and k. a pipe releasably interposed between the second reservoir and the hollow needle and connectable to the first reservoir for flushing any residue contained in the pipe using the first fluid, which pipe includes a check valve for preventing any of the second fluid from entering the first reservoir.

* * * * *